United States Patent [19]
McCrory

[11] Patent Number: 6,146,529
[45] Date of Patent: Nov. 14, 2000

[54] DEVICE FOR ABSORBING OIL FROM WATER

[75] Inventor: Phillip McCrory, Madison, Ala.

[73] Assignee: BEPS, Inc., Huntsville, Ala.

[21] Appl. No.: 09/265,687

[22] Filed: Mar. 10, 1999

[51] Int. Cl.$^7$ ...................................................... E02B 15/10
[52] U.S. Cl. ..................... 210/242.4; 210/502.1; 210/924
[58] Field of Search ............................. 210/242.4, 502.1, 210/505, 508, 924; 112/80.02; 428/15, 88, 89, 90; 156/72, 303.1; 28/107, 110

[56] References Cited

U.S. PATENT DOCUMENTS

| | | | |
|---|---|---|---|
| 3,756,879 | 9/1973 | Bonham | 156/72 |
| 5,403,478 | 4/1995 | Brinkley | 210/242.4 |
| 5,885,451 | 3/1999 | Porrovecchio, Sr. | 210/242.4 |

*Primary Examiner*—Joseph W. Drodge
*Assistant Examiner*—Richard W. Ward
*Attorney, Agent, or Firm*—B. Craig Killough

[57] ABSTRACT

Human hair is formed into a generally planar layer. The layer may comprise a center scrim to which the human hair is attached. The device is buoyant when saturated with oil and water. The device is used to remove oil from water.

12 Claims, 1 Drawing Sheet

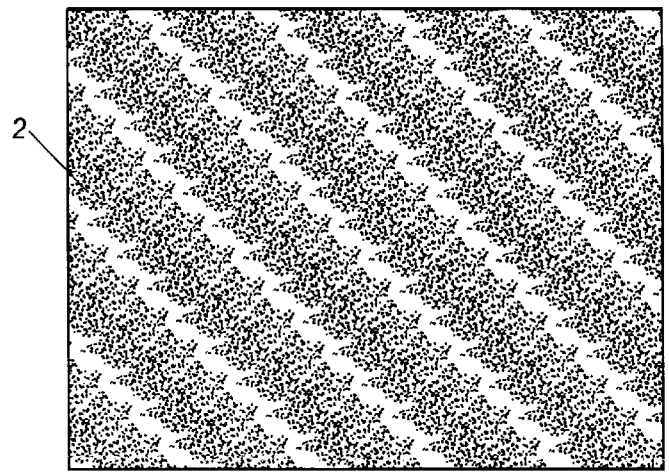
Fig. 1
Fig. 2
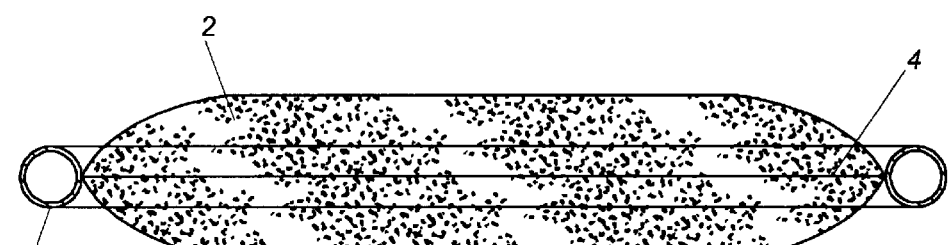
Fig. 3
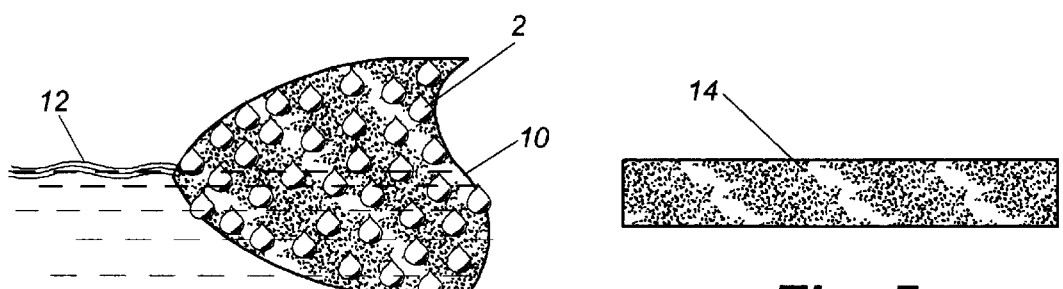
Fig. 4
Fig. 5

DEVICE FOR ABSORBING OIL FROM WATER

FIELD OF THE INVENTION

This invention relates to a device for absorbing oil or liquid materials, and is specifically directed to a device for containing and absorbing oil spills on water.

BACKGROUND OF THE INVENTION

Oil and other liquids having a specific gravity which is less than water are frequently transported by boats and ships. Oil and other potentially hazardous liquids are transported across or through water by pipelines or similar conduits. Such liquid materials are loaded onto ships by means of pipelines, requiring a connection of a pipeline to the ship.

Spills of oil and other liquid materials which float on water are common. Shipwrecks or hazards at sea or in waterways can cause oil or other materials to be spilled or otherwise accidentally discharged into waterways. Even vessels which are carrying oil as cargo are powered by diesel fuels or other petroleum fuels, and fuels and engine lubricants may be accidentally discharged into water.

Pipelines and other conduits which cross waterways are subject to breakage, subjecting the waterway to pollution from discharge of the oil or other material into the waterway. Frequently, oil or other liquid materials are loaded onto ships as cargo by means of pipelines and similar conduits. These pipelines may break or rupture due to accidents or maintenance failures.

All of the examples cited above subject waterways to pollution from oil and other liquid materials having a specific gravity which is less than water. Oil and other materials so discharged float on the water.

Various devices are known in the art which surround and absorb or otherwise capture oil or other floating liquid materials. Some of these devices disclose fabric or netting containing filaments or other oil absorbing material. These devices typically float upon the water, and absorb water as the device contacts the oil spill. The device may be elongated so as to be formed around the oil and contain the oil spill. The prior art discloses such varied absorption materials as hay, straw, bark, sawdust, urethane foam, nylon, rayon, polyester, glass, wool, and cotton.

McCrory, U.S. Pat. No. 5,453,191, describes a device comprising human hair which may be used to absorb oil which is floating on water. The device described therein uses a porous casing, such as nylon mesh, to contain the hair. The casing, however, interferes with the flow of oil contaminated water to the hair. The elimination of a container which is between surface of the water and the human hair is desired, both to improve the efficacy of the human hair oil absorption medium, and to improve the removal of the oil for reuse of the human hair.

Human hair which is available from barber shop cuttings and the like is not readily weavable, and is not readily spun. The length of the hair is generally very short, and is difficult to weave the hair into a textile like sheet or layer, and it is difficult to form the hair into a spun fiber for subsequent processing.

SUMMARY OF THE INVENTION

The present invention comprises human hair which is formed into a generally planar layer which may be referred to at times herein as a mat. Human hair is superior in absorbing oil to those materials disclosed by the prior art. Human hair will absorb oil at a rate of about five (5) pounds of oil per pound of human hair.

The layer or mat formed of human hair may comprise a buoyancy material. The buoyancy material may be a planar layer which is surrounded by hair which is attached to it. The hair absorbs oil. No casing or other container is required, and therefore, the hair is exposed to at all surfaces, without a casing or other container to restrict the access of the oil to the hair. The mat may be rolled to form a boom.

The mat may be formed using a needle punch machine. A center scrim is used to strengthen the mat and hold the human hair. The center scrim can be formed of a material which provides buoyancy to the device.

DESCRIPTION OF THE DRAWINGS

FIG. 1 is a plan view of the device.

FIG. 2 is a side, sectioned view of the device.

FIG. 3 is a side sectioned view of the device incorporating a frame.

FIG. 4 is a partial view of the device, demonstrating the device in use on water.

FIG. 5 is an elevation of the device rolled into a boom.

DESCRIPTION OF THE PREFERRED EMBODIMENT

Referring now to the drawings, FIG. 2 shows the device as having a generally planar form, similar to a mat. Human hair 2 is needle punched to attach the human hair to an upper and lower surface of a scrim 4. The human hair is extends from both the upper and lower surface planes of the scrim, with the scrim forming the center.

FIG. 1 demonstrates the device formed into a generally rectangular mat. The device could be formed into other shapes, however, the device should be generally planar, with at least one of the planar surfaces having human hair exposed on substantially the entire planar surface.

Human hair is difficult to form into a strong layer without the use of a backing or scrim, although a layer of human hair without a scrim will perform the function of removing oil as required by the invention. The scrim 4 is used to hold the individual strands of hair to form the layer, so that the hair does not separate, as it is more likely to do when formed without the scrim. The scrim receives and holds the individual strands of human hair as it is needle punched into the scrim by a needle punch machine.

The scrim may be formed of non porous sheets of nylon, polyurethane or polypropylene. The scrim is preferred to add a floatational quality to the device as it is used in water. The specific gravity of the scrim is, accordingly, less than 1. An example of a suitable scrim material is TYPAR® which is formed into sheets, and cut to an appropriate size.

The device may incorporate a frame 8 to retain the shape of the device, and to keep it from bunching or becoming disfigured, and to keep the surface extended for exposure of the hair to the water. FIG. 3. The frame shown is rectangular, and allows contact of hair which comprises the large planar with the oil coated water. The frame may be any substantially rigid material. The frame may be metal, plastic, or similar material. A frame made of relatively low density material may improve the floatational characteristic of the device. It is not necessary that a frame be used with the device. Human hair is efficient at absorbing oil, and is particularly efficient when present at the desired density. In the preferred embodiment, the density of the human hair which forms the layer or mat is one (1) pound of hair per one-third (⅓) to one half (½) square yard, with hair present on both sides of the scrim. The human hair will absorb approximately five (5) pounds of oil per pound of human hair. The layer which is formed is preferred to be about one inch thick, with hair on both sides of the plane which forms the layer. The length and width may vary, but forming the layer to an overall hair weight of about 1.5 pounds will yield a layer that will pick up about one (1) gallon of oil.

In use, the device floats on the surface of the water. The device achieves maximum contact with the floating oil 12, and has no casing or container to reduce contact of the oil with the hair. Human hair has a natural oil absorbing tendency, and accordingly, absorbs the oil 10. A certain amount of water will be absorbed as well, although the tendency of the hair is to absorb oil in preference to water.

Once the device becomes saturated, the oil, as well as any water present in the device, may be removed by wringing the device by manual or mechanical means. After the oil and water are extracted, the device may be reused. Alternatively, the device may be incinerated and used for fuel, which is not true of other oil recovery devices currently in use.

The generally planar mat form of the device may be rolled to form a boom 14. FIG. 5. The boom is suitable for certain uses of the device in recovering oil.

Human hair as used in the device is readily available. The human hair may be obtained from the sweepings of barber shops, hair salons and the like. It is not necessary that human hair of any particular length or configuration be used in the device. The device has been demonstrated successfully using ordinary sweepings from a hair salon. Unlike the devices of the prior art, the absorbing agent has few, if any, competing commercial uses, since sweepings from beauty salons and barber shops are usually discarded. The use of human hair has no adverse environmental impacts or side effects. The cost and utility are, therefore, superior to absorbing agents disclosed by the prior art.

What is claimed is:

1. A device for absorbing oil floating on water, comprising:

a. a generally planar scrim;

b. a layer formed of sweepings of human hair, wherein said layer is attached to at least one surface of said generally planar scrim by needle punching said human hair into said surface of the scrim such that said human hair materially extends from said surface of the scrim.

2. A device for absorbing oil floating on water as described in claim 1, wherein said generally planar scrim has an upper surface and a lower surface materially extends from said upper surface of said scrim and from said lower surface of said scrim.

3. A device for absorbing oil floating on water as described in claim 2, wherein said human hair is present on said scrim in a density of approximately one (1) pound per one third (⅓) to one half (½) square yard of scrim.

4. A device for absorbing oil floating on water as described in claim 3, wherein the device has a specific gravity of less than 1.

5. A device for absorbing oil floating on water as described in claim 2, wherein the device has a specific gravity of less than 1.

6. A device for absorbing oil floating on water as described in claim 1, further comprising a frame which is present about a perimeter of said scrim, and wherein said human hair is not substantially covered by said frame.

7. A device for absorbing oil floating on water as described in claim 6, wherein said waste human hair is present on said scrim in a density of approximately one (1) pound per one third (⅓) to one half (½) square yard of scrim.

8. A device for absorbing oil floating on water as described in claim 6, wherein the device has a specific gravity of less than 1.

9. A device for absorbing oil floating on water as described in claim 1, wherein said human hair is present on said scrim in a density of approximately one (1) pound per one third (⅓) to one half (½) square yard of scrim.

10. A device for absorbing oil floating on water as described in claim 9, wherein said waste human hair is present on said scrim in a density of approximately one (1) pound per one third (⅓) to one half (½) square yard of scrim.

11. A device for absorbing oil floating on water as described in claim 9, wherein the device has a specific gravity of less than 1.

12. A device for absorbing oil floating on water as described in claim 1, wherein the device has a specific gravity of less than 1.

* * * * *